United States Patent
Hsu et al.

(10) Patent No.: US 10,044,207 B2
(45) Date of Patent: Aug. 7, 2018

(54) UNIVERSAL POWER DELIVERY CABLE, POWER DELIVERY CONTROLLER APPLIED TO A UNIVERSAL SERIAL BUS CABLE, AND UNIVERSAL SERIAL BUS CABLE

(71) Applicant: Etron Technology, Inc., Hsinchu (TW)

(72) Inventors: Shih-Min Hsu, Taipei (TW); Shao-Hung Chen, New Taipei (TW)

(73) Assignee: eEver Technology, Inc., Taipei (TW)

( * ) Notice: Subject to any disclaimer, the term of this patent is extended or adjusted under 35 U.S.C. 154(b) by 175 days.

(21) Appl. No.: 14/522,604

(22) Filed: Oct. 24, 2014

(65) Prior Publication Data

US 2015/0115897 A1  Apr. 30, 2015

Related U.S. Application Data

(60) Provisional application No. 61/894,919, filed on Oct. 24, 2013.

(51) Int. Cl.
*H02J 7/00* (2006.01)
*H01R 13/631* (2006.01)

(52) U.S. Cl.
CPC .......... *H02J 7/0052* (2013.01); *H01R 13/631* (2013.01); *H02J 2007/0001* (2013.01); *H02J 2007/0062* (2013.01)

(58) Field of Classification Search
CPC ...................................... H02J 7/0052
USPC ....................................... 320/138
See application file for complete search history.

(56) References Cited

U.S. PATENT DOCUMENTS

| 6,064,177 | A  | * | 5/2000  | Dixon   | H02J 7/0045 |
|           |    |   |         |         | 320/107     |
| 6,211,649 | B1 | * | 4/2001  | Matsuda | G06F 1/266  |
|           |    |   |         |         | 320/115     |
| 9,148,001 | B1 | * | 9/2015  | Mohanty | H02G 3/00   |
| 2007/0294457 | A1 | * | 12/2007 | Gantman | G06F 3/0605 |
|           |    |   |         |         | 710/313     |
| 2008/0229402 | A1 | * | 9/2008  | Smetters | H04L 63/0853 |
|           |    |   |         |         | 726/9       |
| 2008/0231235 | A1 | * | 9/2008  | Thijssen | H02J 7/0052 |
|           |    |   |         |         | 320/138     |
| 2009/0193511 | A1 | * | 7/2009  | Noe     | G06F 21/34  |
|           |    |   |         |         | 726/9       |
| 2010/0262845 | A1 | * | 10/2010 | Goel    | G06F 11/1456 |
|           |    |   |         |         | 713/300     |

(Continued)

*Primary Examiner* — Drew A Dunn
*Assistant Examiner* — Jerry D Robbins
(74) *Attorney, Agent, or Firm* — Winston Hsu (57) ABSTRACT

A universal power delivery cable includes a first connector, a second connector, and a power delivery controller. The first connector is used for coupling a host, wherein the host has a power delivery function. The second connector is used for coupling an electronic device. When the first connector is coupled the host, the second connector is coupled the electronic device, and the electronic device does not have the power delivery function, the power delivery controller makes the electronic device imitate to have the power delivery function. After the power delivery controller makes the electronic device imitate to have the power delivery function, the host charges the electronic device according to a specification of the power delivery function and a specification of the electronic device.

9 Claims, 6 Drawing Sheets

(56) References Cited

U.S. PATENT DOCUMENTS

| | | | |
|---|---|---|---|
| 2011/0018522 A1* | 1/2011 | Li | H02J 7/0052 |
| | | | 323/318 |
| 2011/0314135 A1* | 12/2011 | Castrogiovanni | G06F 17/30197 |
| | | | 709/219 |
| 2012/0045939 A1* | 2/2012 | Pocrass | H01R 31/065 |
| | | | 439/620.22 |
| 2012/0064772 A1* | 3/2012 | Pocrass | H02J 7/0042 |
| | | | 439/625 |
| 2015/0137861 A1* | 5/2015 | Cornelius | G01D 5/12 |
| | | | 327/141 |

* cited by examiner

UNIVERSAL POWER DELIVERY CABLE, POWER DELIVERY CONTROLLER APPLIED TO A UNIVERSAL SERIAL BUS CABLE, AND UNIVERSAL SERIAL BUS CABLE

CROSS REFERENCE TO RELATED APPLICATIONS

This application claims the benefit of U.S. Provisional Application No. 61/894,919, filed on Oct. 24, 2013 and entitled "USB Power Delivery Universal Cable," the contents of which are incorporated herein by reference.

BACKGROUND OF THE INVENTION

1. Field of the Invention

The present invention relates to a universal power delivery cable and a power delivery controller applied to a Universal Serial Bus (USB) cable, and particularly to a universal power delivery cable and a power delivery controller applied to a USB cable that can make a host charge an electronic device without power delivery function according to a specification of the power delivery function.

2. Description of the Prior Art

Nowadays, portable electronic devices gradually become popular, resulting in the portable electronic devices significantly increasing convenience and entertainment of user's daily life. Because a user may simultaneously enable a plurality of application programs on a portable electronic device, battery power of the portable electronic device will be quickly depleted, resulting in the portable electronic device is forced to be shut down. Therefore, the prior art provides a power delivery technology, wherein the power delivery technology can make a host charge a battery of the portable electronic device through a USB cable according to a specification of the power delivery function, but the host and the portable electronic device need to have a power delivery function. However, the power delivery function does not yet become a standard function of portable electronic devices, so the host may not charge the portable electronic device according to the specification of the power delivery function because the portable electronic device does not have power delivery function. Therefore, the prior art is not still a good charge solution for the user.

SUMMARY OF THE INVENTION

An embodiment provides a universal power delivery cable. The universal power delivery cable includes a first connector, a second connector, and a power delivery controller. The power delivery controller makes an electronic device imitate to have a power delivery function when the first connector is coupled to a host with a power delivery function, the second connector is coupled to the electronic device, and the electronic device does not have the power delivery function. After the power delivery controller makes the electronic device imitate to have the power delivery function, the host charges the electronic device according to a specification of the power delivery function and a specification of the electronic device.

Another embodiment provides a power delivery controller applied to a USB cable. The power delivery controller includes a detection unit. The detection unit is used for detecting whether an electronic device has a power delivery function when a first connector of the USB cable is coupled to a host with the power delivery function, a second connector of the USB cable is coupled to the electronic device, and the power delivery controller is coupled to the second connector. When the electronic device does not have the power delivery function, the power delivery controller makes the electronic device imitate to have the power delivery function, and the host charges the electronic device according to a specification of the power delivery function and a specification of the electronic device after the power delivery controller makes the electronic device imitate to have the power delivery function.

Another embodiment provides a USB cable. The USB cable includes a first connector, a second connector, and a power delivery controller. The first connector is used for coupling to a host with a power delivery function. The second connector is used for coupling to an electronic device. The power delivery controller controls the electronic device to make power transmission for charge between the electronic device and the host when the power delivery controller detects that the electronic device is not met a specification of the power delivery function.

The present invention provides a universal power delivery cable and a power delivery controller applied to a USB cable. When a host with a power delivery function charges an electronic device without the power delivery function, the universal power delivery cable and the power delivery controller can make the electronic device imitate to have the power delivery function. After the power delivery controller makes the electronic device imitate to have the power delivery function, the host can charge the electronic device according to a specification of the power delivery function and a specification of the electronic device. Therefore, compared to the prior art, the present invention can still make the host charge the electronic device without the power delivery function according to the specification of the power delivery function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
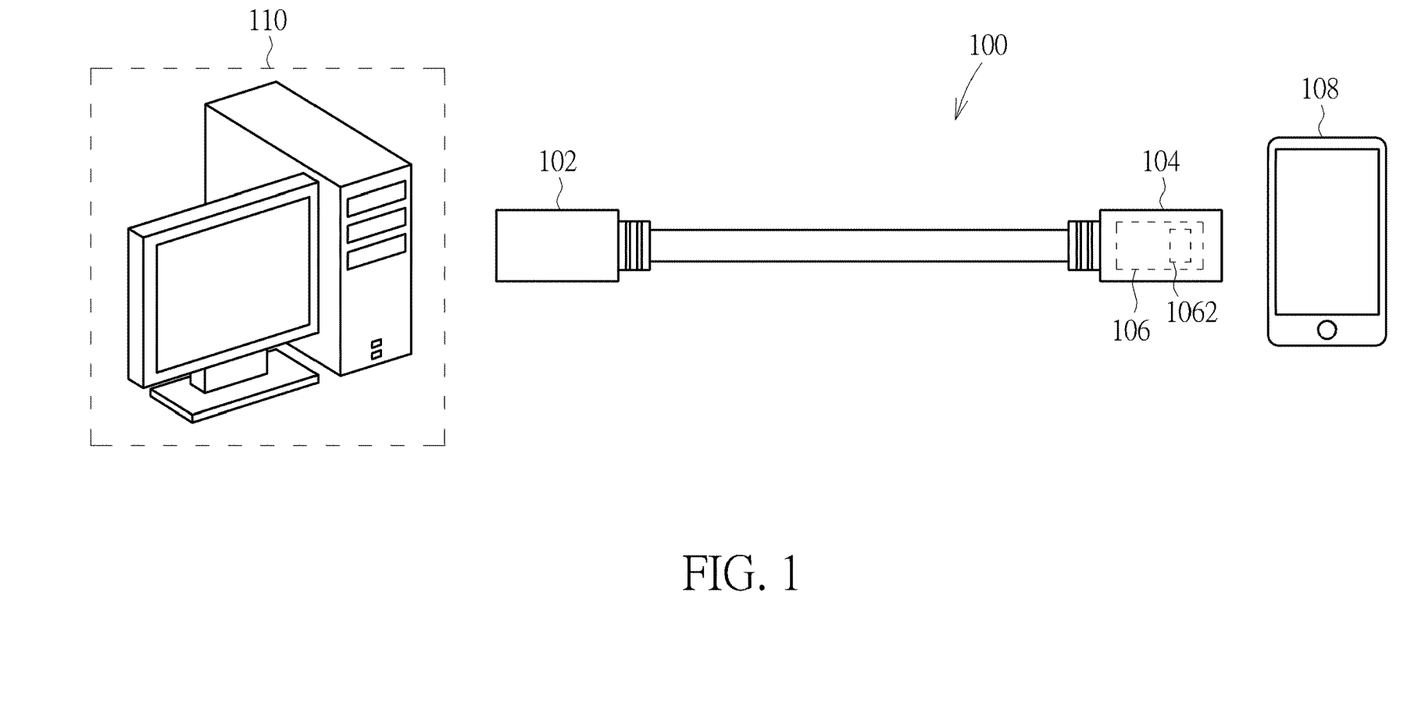
FIG. 1 is a diagram illustrating a universal power delivery cable according to a first embodiment.

Please refer to FIG. 1. FIG. 1 is a diagram illustrating a universal power delivery cable 100 according to a first embodiment. As shown in FIG. 1, the universal power delivery cable 100 includes a first connector 102, a second connector 104, and a power delivery controller 106, wherein the second connector 104 includes the power delivery controller 106. But, the present invention is not limited to the second connector 104 including the power delivery controller 106. That is to say, the power delivery controller 106 can be also included in the first connector 102. In addition, the universal power delivery cable 100 can be a Universal Serial Bus (USB) cable, the first connector 102 can be a type A connector, a type B connector, a mini-A connector, a mini-B connector, a micro-A connector, or a micro-B connector of a USB, and the second connector 104 can be a type A connector, a type B connector, a mini-A connector, a mini-B connector, a micro-A connector, or a micro-B connector of a USB. But, the present invention is not limited to the universal power delivery cable 100 being a USB cable. That is to say, the universal power delivery cable 100 can also be another bus cable compatible with a specification USB. Meanwhile, the first connector 102 and the second connector 104 are changed accordingly with the universal power delivery cable 100. In addition, in another embodiment of the present invention, the first connector 102 and the second connector 104 can be other USB connectors compatible with the universal power delivery cable 100. In addition, in another embodiment of the present invention, the first connector 102 and the second connector 104 can be other non-USB connectors compatible with the universal power delivery cable 100.

When a user wants to utilize the universal power delivery cable 100 to charge an electronic device 108, the first connector 102 is coupled to a host 110, wherein the host 110 has a power delivery (PD) function; and the second connector 104 is coupled to the electronic device 108. After the first connector 102 is coupled to the host 110 and the second connector 104 is coupled to the electronic device 108, a detection unit 1062 included in the power delivery controller 106 can detecting whether the electronic device 108 has the power delivery function. When the electronic device 108 does not have the power delivery function, the power delivery controller 106 can make the electronic device 108 imitate to have the power delivery function. After the power delivery controller 106 makes the electronic device 108 imitate to have the power delivery function, the host 110 can charge the electronic device 108 according to a specification of the power delivery function and a specification of the electronic device 108. For example, the host 110 can utilize a 5V voltage and a 5 A current to charge the electronic device 108. In addition, when the electronic device 108 has the power delivery function, the power delivery controller 106 is disabled to save power. In addition, in another embodiment of the present invention, when the electronic device 108 has the power delivery function, the power delivery controller 106 is not disabled.

In addition, in another embodiment of the present invention, when the detection unit 1062 included in the power delivery controller 106 detects that the electronic device 108 is not met the specification of the power delivery function, the power delivery controller 106 makes the electronic device 108 imitate to have the power delivery function so as to make power transmission for charge between the host 110 and the electronic device 108. That is to say, when the electronic device 108 is not met the specification of the power delivery function, the power delivery controller 106 can make the electronic device 108 imitate to have the power delivery function so as to make the host 110 charge the electronic device 108 or the electronic device 108 charge the host 110. In addition, when the detection unit 1062 included in the power delivery controller 106 detects that the electronic device 108 is met the specification of the power delivery function, the power delivery controller 106 is not involved in the power transmission for charge between the electronic device 108 and the host 110.

Figure 2:
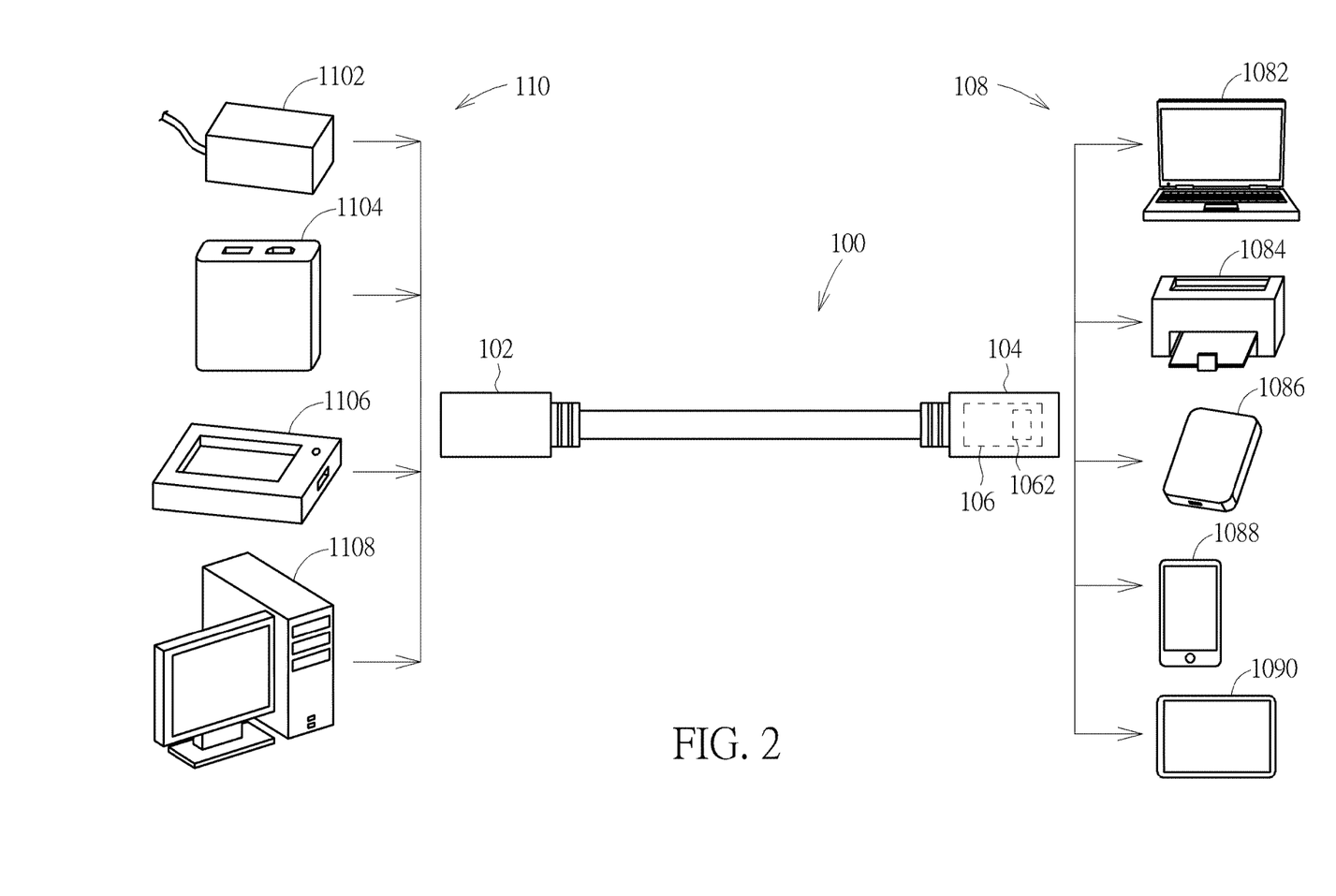
FIG. 2 is a diagram illustrating the host, the universal power delivery cable, and the electronic device.

Please refer to FIG. 2. FIG. 2 is a diagram illustrating the host 110, the universal power delivery cable 100, and the electronic device 108. As shown in FIG. 2, the host 110 can be a charger 1102, a power bank 1104, a charging base 1106, or a desktop computer 1108, and the electronic device 108 can be a notebook 1082, a printer 1084, an external hard drive 1086, a smart phone 1088, or a tablet personal computer 1090.

Figure 3:
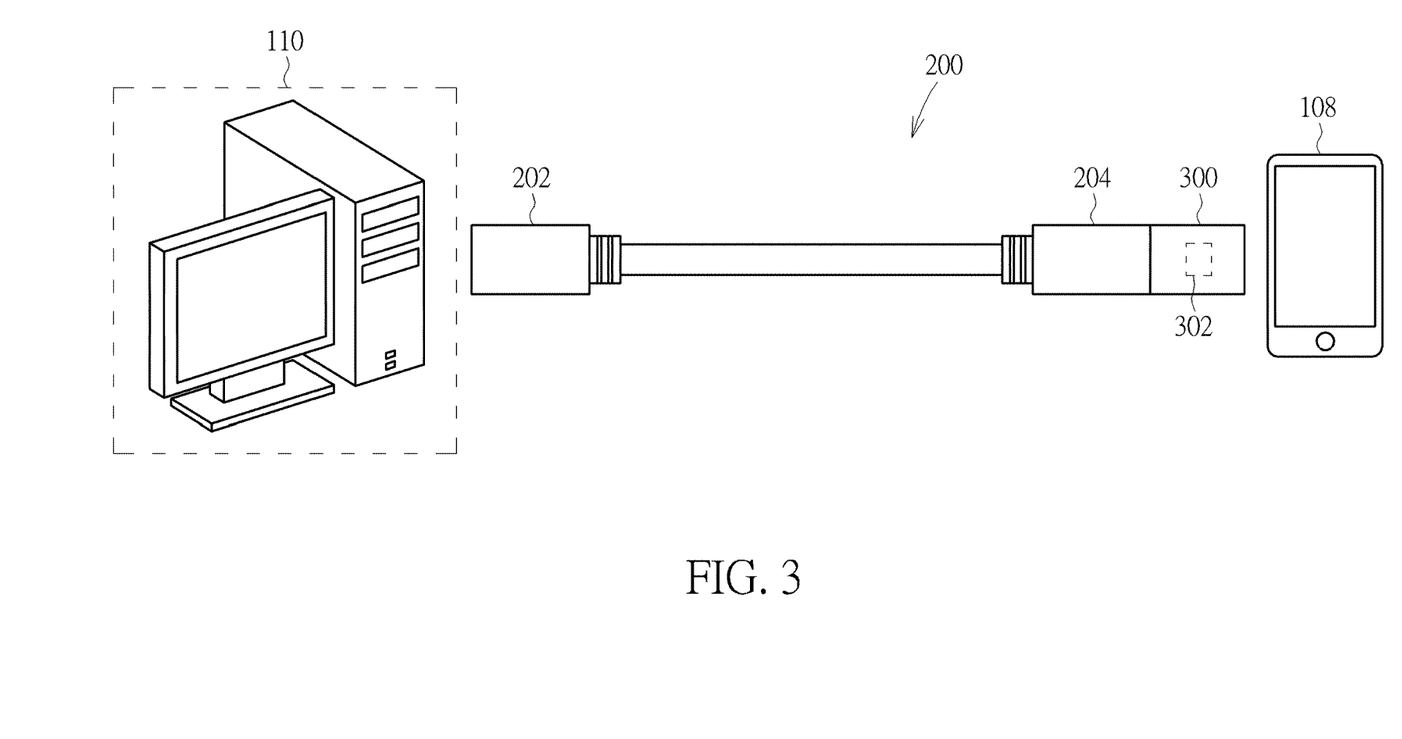
FIG. 3 is a diagram illustrating a power delivery controller applied to a USB cable according to a second embodiment.
Figure 4:
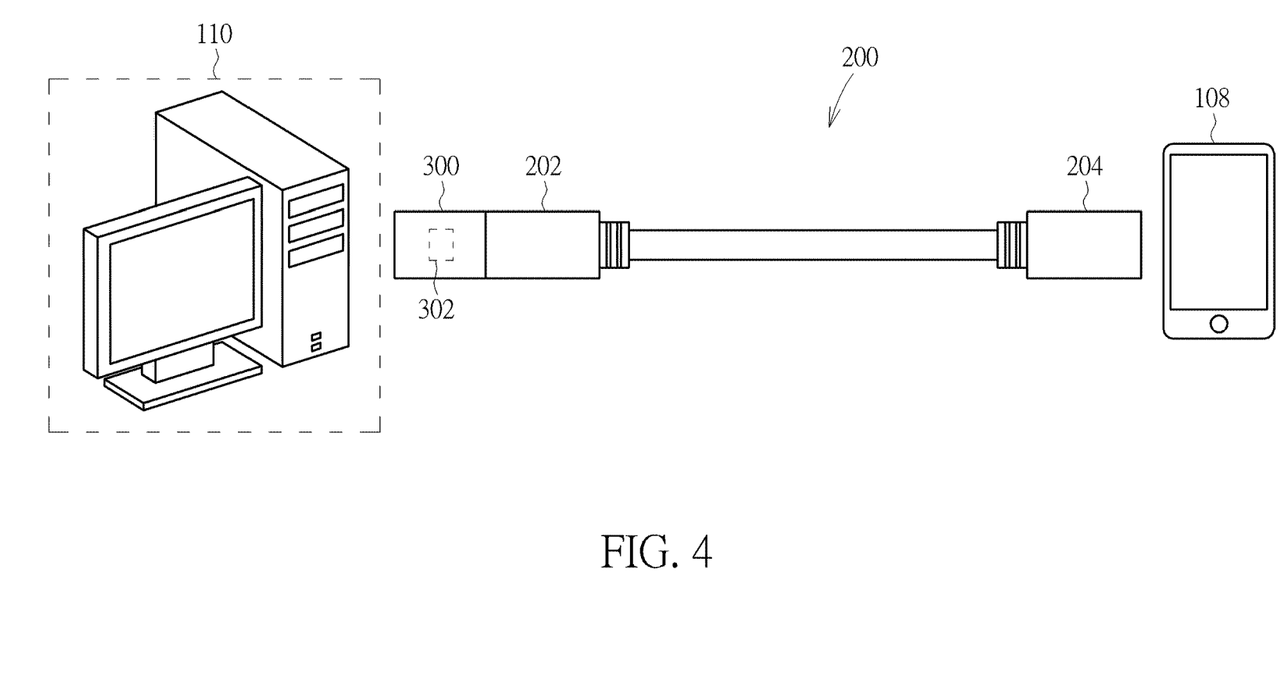
FIG. 4 is a diagram illustrating a power delivery controller applied to a USB cable according to a third embodiment.
Figure 5:
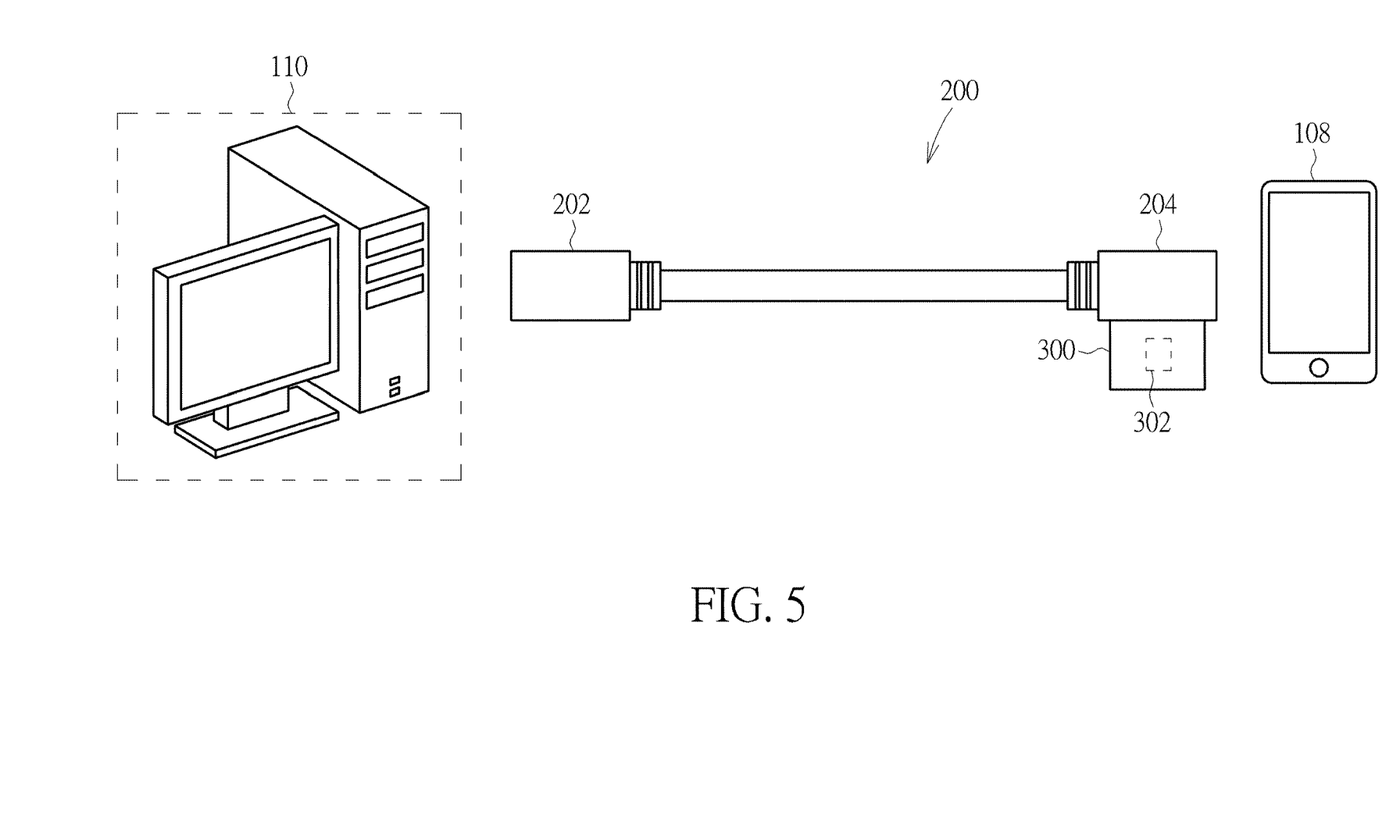
FIG. 5 is a diagram illustrating a power delivery controller applied to a USB cable according to a fourth embodiment.
Figure 6:
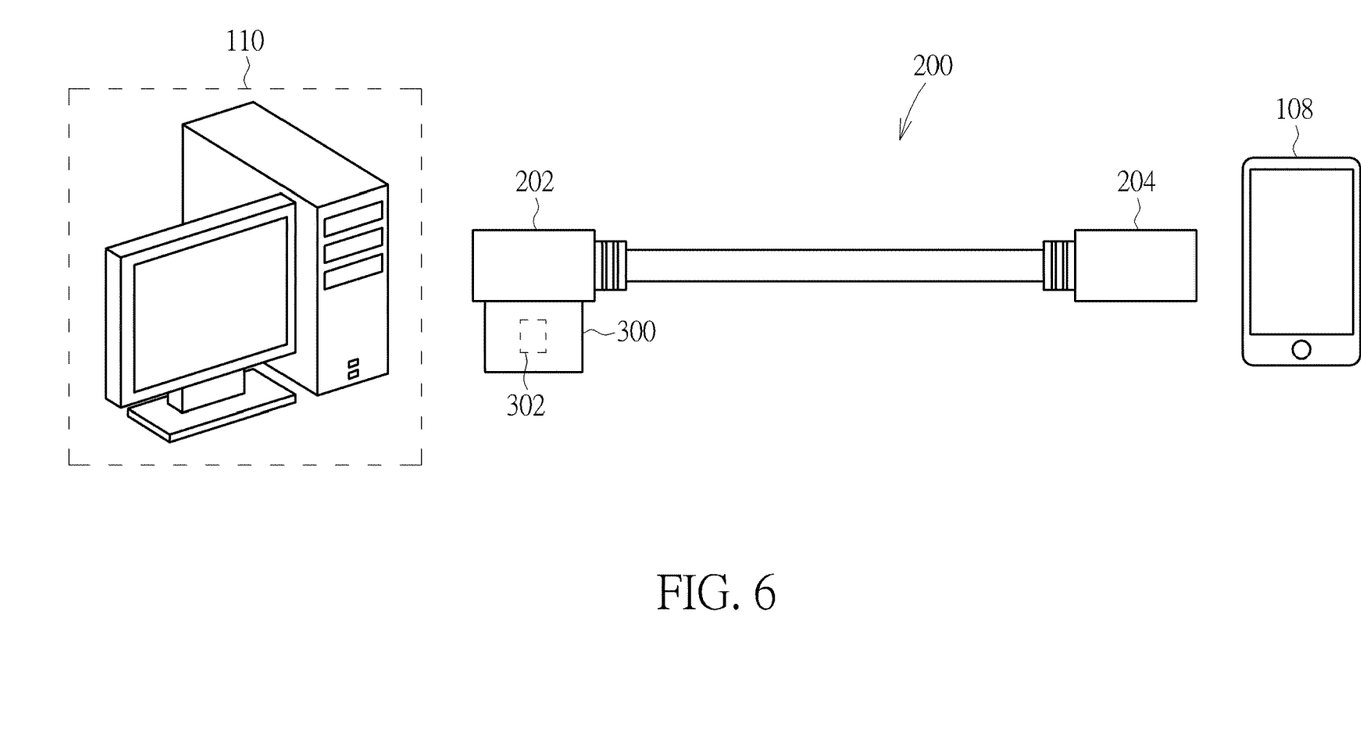
FIG. 6 is a diagram illustrating a power delivery controller applied to a USB cable according to a fifth embodiment.

Please refer to FIG. 3. FIG. 3 is a diagram illustrating a power delivery controller 300 applied to a USB cable 200 according to a second embodiment. As shown in FIG. 3, the USB cable 200 is a regular USB cable. When the user wants to utilize the universal power delivery cable 200 to charge the electronic device 108, a first connector 202 of the USB cable 200 is coupled to the host 110, wherein the host 110 has the power delivery function; and a second connector 204 of the USB cable 200 is coupled to the electronic device 108 through the power delivery controller 300. After the first connector 202 is coupled to host 110 and the second connector 204 is coupled to the electronic device 108 through the power delivery controller 300, a detection unit 302 of the power delivery controller 300 can detect whether the electronic device 108 has the power delivery function. When the electronic device 108 does not have the power delivery function, the power delivery controller 300 can make the electronic device 108 imitate to have the power delivery function. After the power delivery controller 300 makes the electronic device 108 imitate to have the power delivery function, the host 110 can charge the electronic device 108 according to the specification of the power delivery function and the specification of the electronic device 108. In addition, the present invention is not limited to the second connector 204 coupling to the electronic device 108 through the power delivery controller 300. In another embodiment of the present invention, when the user wants to utilize the universal power delivery cable 200 to charge the electronic device 108, the first connector 202 of the USB cable 200 is coupled to the host 110 through the power delivery controller 300 and the second connector 204 of the USB cable 200 is coupled to the electronic device 108 (as shown in FIG. 4). In addition, in another embodiment of the present invention, when the user wants to utilize the universal power delivery cable 200 to charge the electronic device 108, the first connector 202 of the USB cable 200 is directly coupled to the host 110 and the second connector 204 is directly coupled to the electronic device 108 (as shown in FIGS. 5, 6).

To sum up, when the host with the power delivery function charges the electronic device without the power delivery function, the universal power delivery cable and the power delivery controller provided by the present invention can make the electronic device imitate to have the power delivery function. After the power delivery controller makes the electronic device imitate to have the power delivery function, the host can charge the electronic device according to the specification of the power delivery function and the specification of the electronic device. Therefore, compared to the prior art, the present invention can still make the host charge the electronic device without the power delivery function according to the specification of the power delivery function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A universal power delivery cable, comprising:
   a first connector coupled to a host wherein the host has a power delivery function:
   a second connector coupled to an electronic device; and
   a power delivery controller setting the electronic device to communicate with the host according to a specification of the power delivery function when the power delivery controller detects that the electronic device does not have the power delivery function, wherein the power delivery controller is not involved in power transmission between the electronic device and the host when the power delivery controller detects that the electronic device has the power delivery function;
   wherein after the power delivery controller sets the electronic device to communicate with the host according to the specification of the power delivery function, the host charges the electronic device according to the specification of the power delivery function and a maximum endurable voltage/current of the electronic device.

2. The universal power delivery cable of claim 1, wherein the first connector is a type A connector, a type B connector, a mini-A connector, a mini-B connector, a micro-A connector, or a micro-B connector of a Universal Serial Bus (USB).

3. The universal power delivery cable of claim 1, wherein the second connector is a type A connector, a type B connector, a mini-A connector, a mini-B connector, a micro-A connector, or a micro-B connector of a USB.

4. The universal power delivery cable of claim 1, wherein the second connector comprises the power delivery controller.

5. The universal power delivery cable of claim 1, wherein when the first connector is coupled to the host, the second connector is coupled to the electronic device, and the electronic device has the power delivery function, the power delivery controller is disabled.

6. The universal power delivery cable of claim 1, wherein power delivery controller comprises:
   a detection unit detecting whether the electronic device has the power delivery function when the first connector is coupled to the host and the second connector is coupled to the electronic device.

7. A power delivery controller applied to a USB cable, the power delivery controller comprising:
   a detection unit detecting whether an electronic device has a power delivery function when a first connector of the USB cable is coupled to a host with the power delivery function, a second connector of the USB cable is coupled to the electronic device, and the power delivery controller is coupled to the second connector;
   wherein when the electronic device does not have the power delivery function, the power delivery controller sets the electronic device to communicate with the host according to a specification of the power delivery function, and the host charges the electronic device according to the specification of the power delivery function and a maximum endurable voltage/current of the electronic device after the power delivery controller sets the electronic device to communicate with the host according to the specification of the power delivery function, and when the power delivery controller detects that the electronic device has the power delivery function, the power delivery controller is not involved in power transmission between the electronic device and the host.

8. A USB cable, comprising:
   a first connector for coupling to a host with a power delivery function;
   a second connector for coupling to an electronic device; and
   a power delivery controller controlling the electronic device to make power transmission for charge between the electronic device and the host when the power delivery controller detects that the electronic device is not met a specification of the power delivery function, wherein when the power delivery controller detects that the electronic device is met the specification of the power delivery function, the power delivery controller is not involved in the power transmission for charge between the electronic device and the host;
   wherein the power delivery controller controls the electronic device to make the power transmission for charge between the electronic device and the host according to the specification of the power delivery function and a maximum endurable voltage/current of the electronic device,
   after the power delivery controller sets the electronic device to communicate with the host according to the specification of the power delivery function.

9. The USB cable of claim 8, wherein when the power delivery controller detects that the electronic device is not met the specification of the power delivery function, the power delivery controller sets the electronic device to communicate with the host according to the specification of the power delivery function so as to make the power transmission for charge between the electronic device and the host.

* * * * *